June 25, 1935.  E. E. ARNOLD  2,005,882
TRANSMISSION LINE SUSPENSION
Filed June 29, 1933
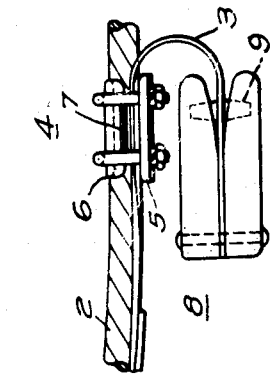
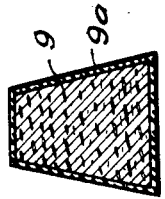
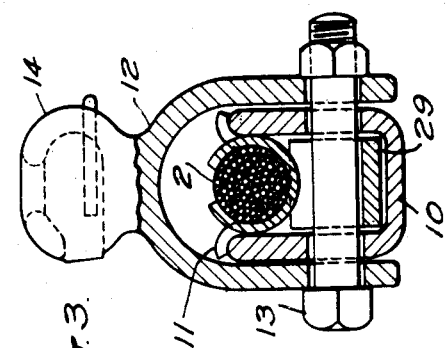
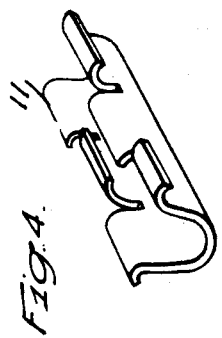
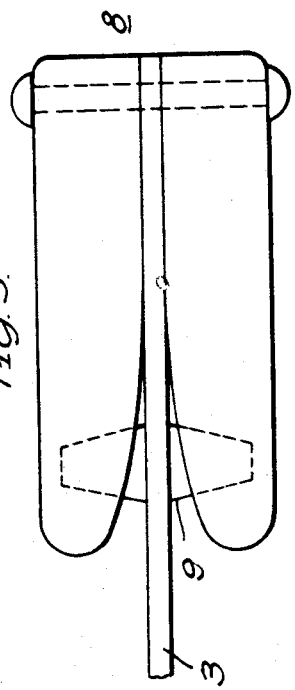
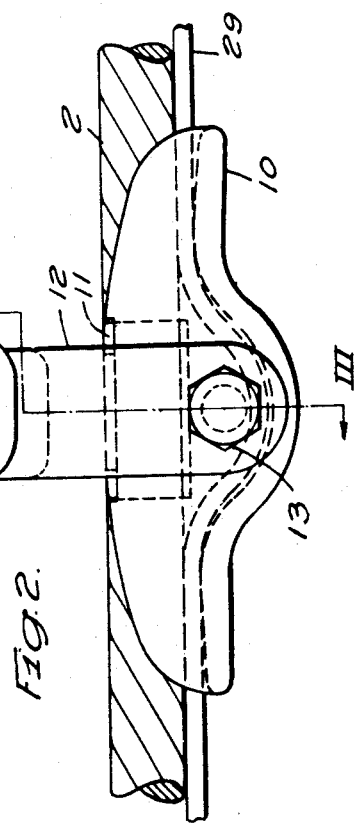
INVENTOR
Edwin E. Arnold.
BY
ATTORNEY Patented June 25, 1935

2,005,882

UNITED STATES PATENT OFFICE 2,005,882

TRANSMISSION LINE SUSPENSION

Edwin E. Arnold, Pittsburgh, Pa., assignor to Westinghouse Electric & Manufacturing Company, East Pittsburgh, Pa., a corporation of Pennsylvania Application June 29, 1933, Serial No. 678,247

8 Claims. (Cl. 248—63)

The present invention relates to cable suspension devices for securing transmission line cables to supporting towers, and more particularly to a cable suspension of improved design wherein molecular fatigue of the cable adjacent to the support, resulting from vibration of the cable, is substantially eliminated, and the vibration itself is effectively damped.

In the past much thought has been given to the prevention of transmission line breakage, and the consequent reduction in failure of power supply and strain or damage to the supporting towers, and various types of clamps or reenforcements have been proposed for reducing or attempting to eliminate these difficulties. In substantially all cases, however, there has been a more or less rigid connection between the cable and the supporting structure through the clamp, so that cable vibrations reacting against the clamp resulted in sharp bending of the cable at the point of clamping. Inevitable molecular fatigue and consequent breakage resulted.

Cable vibrations which cause a horizontal movement or swing of the cable are not particularly harmful, because the cable and clamp are free to swing together about the point of support of the insulator string. It is necessary, therefore, only to particularly guard against vibrations causing vertical movement of the cable, which movements cause a bending of the cable at the point of clamping because vertical movement of the clamp is restricted.

It is an object of the present invention to provide a simple and inexpensive suspension which provides a resilient connection between the cable and the supporting structure to prevent the damaging effect of line vibration on the cable, and embodies means for effectively damping such vibration.

In practicing the invention, an elongated spring of flexible strip material underlies the conductor for a substantial part of the length thereof and is firmly clamped to the conductor at widely spaced points. A supporting shoe underlies the strip at substantially the mid point thereof and is pivotally secured to a yoke, which in turn is secured to the cross arm of the transmission line tower, or other supporting structure, by means of a string of suspension insulators.

The extremities of the elongated spring are adapted to resiliently support weighted members cooperating with energy absorbing means to damp vibrations occurring on the conductor.

In the drawing, Figure 1 is a view in elevation of one modification of the clamp constituting the present invention;

Fig. 2 is an enlarged view in elevation of the central supporting structure, corresponding to that shown in Fig. 1, of another modification of the invention;

Fig. 3 is a view in lateral section taken on the line III—III in Fig. 2;

Fig. 4 is a perspective view of a cable receiving element shown in Figs. 2 and 3;

Fig. 5 is an enlarged view in elevation of the vibration damping device shown in Fig. 1, and Fig. 6 is an enlarged sectional view of a vibration absorbing element shown in Fig. 5.

Referring more specifically to the drawing and particularly Fig. 1 thereof, a multi-leaf spring 1 of flexible strip material, such as spring steel, is adapted to underlie the cable 2 for a substantial distance. As shown, the spring is composed of three leaves of different length; although quite obviously the number and dimensions of the leaves, as well as the material of which they are made, may be varied to meet the requirements of a given installation.

Adjacent to its end portions, the longest leaf of the spring 1 is formed to approximately conform to the contour of the cable 2, and is provided with lateral extensions 3 extending at an angle with respect to the axis of the cable.

The mid-portions of the leaves of the spring 1 are bent or deformed and serve the double purpose of imparting a limited longitudinal resiliency to the spring, and of maintaining the spring in proper position with reference to the supporting structure, as hereinafter described. It is contemplated that the spring shall be of substantial length, of the order of several feet, so that the ends will be a substantial distance from the point of support.

The ends of the spring 1 are secured to the cable by means of clamps 4, each comprising a lower shoe 5 and an upper shoe 6 clamped together with U-bolts, as shown. The longitudinal edges of the upper clamping shoes 6 are provided with lugs 7 to properly position the shoe with reference to the U-bolts, and the lateral extensions 3 cooperate with weights 8 for a purpose described hereinafter.

A supporting shoe or saddle 10 is disposed about the mid-point of the spring 1 and loosely surrounds the conductor 2. A spacing or cable-receiving member 11, shown more clearly in Fig. 4, is provided with outwardly extending ears adapted to cooperate with notches formed in the upper edge of the shoe 10, and inwardly extending ears adapted to embrace the cable. The spacing member 11 may be of aluminum or copper sheet material (for use with aluminum or copper cables, respectively) punched to the form shown, and is effective to prevent lateral movement, and hence possible abrasion, of the cable. The outwardly extending ears cooperating with the notches in the edges of the shoe insure that these parts will be maintained in proper operative relation, and the inwardly extending ears maintain the spacing member in proper position on the cable. It is probable that the inwardly extending ears are not entirely necessary because in a cable supporting arrangement according to the present invention, there is little or no tendency for vertical movement of the cable with reference to the shoe 10.

By the provision of spacing members, such as 11, of sheet material of different thickness, a shoe 10 having a given width may properly be used to receive cables of various diameters, thereby affording manufacturing economy.

A cupped portion in the saddle 10 cooperates with the bent or deformed mid-portions of the springs 1 to prevent substantial movement of the shoe longitudinally of the spring, and to maintain the springs and saddle in proper operative relation.

A supporting yoke or stirrup 12 straddles the saddle 10 and is pivoted thereto by means of a bolt 13. The upper part of the stirrup is provided with a socket 14 of a usual type for securing the assembly to a cooperating element at the bottom of a string of insulators, which in turn is secured to the transmission line tower or other support. It will be noted that the bolt 13 extends transversely of the saddle 10 above the bent portion in the springs 1 and beneath the cable 2 to maintain the saddle in proper position with reference to the spring and cable.

The extremities 3 of the elongated spring member 1 are return bent and secured to vibration damping means 8. The damping means comprises two masses of lead, cast iron, or other suitable material, clamped together at their lower extremities to the end of the spring member, and having a combined weight of the order of ten pounds for ordinary weight of cable and length span. With such construction, the weights are free to vibrate in a vertical plane, due to the resiliency of the spring portion 3, and exert a force in opposition to the vibration of the cable. It is understood, of course, that the position of the clamp 4, and accordingly the point at which the damping force is applied to the cable, is preferably between node points in the cable vibration wave, and the position of the clamp and the weight of the mass 8 depend upon the cable dimensions and material, length of the span, cable tension, and other such considerations.

A further feature of the dampening device 8 is that means are also provided to damp oscillations on the device itself. It will be noted that the inner faces of the weight members, contacting with the sides of spring portion 3, are curves so that oscillation of the dampening device causes these faces to tend to roll along the portion 3. Preferably the curve of the faces is a logarithmic one, which is the shape assumed by the portion 3 when it bends resiliently, so that bending of the portion 3 causes an increasing contact area between the strip and either one of the curved faces depending upon the direction of the bend.

The center of gravity of the weights is beyond the normal point of contact between the curved surfaces and the flat sides of the strip, so that as the strip portion 3 vibrates the point of contact will be varied to automatically change the natural periodicity of the strip, and accordingly damp its oscillation.

In order to further absorb or dissipate the energy of the vibration forces set up in the cable, and transmitted to the device 8, two bodies 9 of resilient material, are disposed between the weight portions and the spring 3, as shown more clearly in Fig. 5. The bodies 9 may be of any suitable resilient material having substantial internal friction, to afford a medium for the dissipation of energy and are disposed in recesses cast or otherwise formed in the curved faces of the weight portions. The bodies 9 are less in diameter than the size of the recesses so that they may freely expand circumferentially, and are such size that they are normally under axial compression. A suitable material is a cheap grade of rubber, containing cork, mineral filler, sand or the like, such as ordinary rubber stoppers used for bottling purposes. As the weight portions oscillate with reference to the spring 3, the bodies 9 will be compressed and expanded, and due to their internal friction will dissipate the energy transmitted to the damping device, and damp the vibration in the device and hence alloy the source of vibration in the cable itself.

In order to prevent aging of the bodies 9, particularly when they are of rubber, they should be coated with a protective compound. For example, if rubber corks are used, they may be first dipped in rubber latex or pure rubber compound with an oxidation preventive.

In Figs. 2 and 3, the construction is the same as that shown in Fig. 1 except that the spring comprises a single strip 29 of flexible material, instead of a plurality of strips as in Fig. 1. Such construction may be considered preferable for many applications, both for engineering and economic reasons. The various parts shown in Figs. 2 and 3 are numbered to correspond with the corresponding parts shown in Fig. 1.

It should be apparent that, with the construction described, vibrations occurring in the line 2 between spans will cause movement at the ends of the strip or spring, but there is no relative movement between the clamps 4 and the cable 2 and there is, accordingly, no bending of the conductor at the point of clamping. In addition, the cable 2 extends freely through the shoe 10 and, since relative movement is permitted, there is no stress imposed upon the cable at the point of support; the spacing member 11 being effective merely to prevent lateral horizontal movement of the cable relative to the shoe.

In view of the fact that the strip or spring is resiliently flexible in a vertical plane, it is effective to damp or absorb, to some extent, vibrations on the cables; and the widely spaced clamps in conjunction with the longitudinal resiliency of the strip afforded by the bend in the mid-portion thereof, result in a desired stress distribution and stress relief in the cable and supporting structure.

In addition, the damping devices 8 are effective to damp oscillatory movement of the conductor, and are assisted in this function by the frictional contact between the leaves of the elongated spring, as in Fig. 1, and the frictional contact between the spring and the conductor. The strip or spring is so dimensioned and of such material that it can assume safely the strain imposed by the weight of the cable, and constitutes a resilient tie between the clamps.

Inasmuch as it is impossible to completely eliminate the vibration in a transmission line span, a practical solution of the problem of cable breakage due to vibration is the provision of a structure, as above described, wherein a high degree of damping is afforded and the effect of the vibration on the cable is eliminated, or at least substantially reduced.

In the majority of cases, cable vibration is caused by the aerodynamic effect of wind on the cable. There is seldom a sudden jar or shock to initiate the oscillation, but rather a constantly applied small force which is cumulative in setting up the oscillation. A successful damping device, therefore, need be capable of only a relatively small damping action, or be capable of dissipating a relatively small amount of energy. Accordingly, although the rubber inserts 9 are relatively small, they have an appreciable effect on the damping action, and coupled with the action of the weights on the spring 3, and the friction between the spring and cable, the oscillating forces resulting from cable vibration are effectively damped. The major portion of the damping action, of course, is effected by the weights 8 and resilient spring portion 3 by changing the period of the primary vibration and to transmitting a secondary period to the energy absorbing members for dissipation thereby. That is, the primary vibration on the cable causes a vibration of the resilient spring portion 3 which has the natural period of a vibrating reed. This secondary vibration, of the spring portion 3, has superimposed upon it the vibration of the weights 8 as they oscillate about the point of contact with the spring portion; the point of contact being variable but eccentric with respect to the center of gravity of the weights. The secondary vibration changes the period of the primary cable vibration, and the vibrational energy is absorbed and dissipated by the rubber inserts 9.

Although the rubber inserts 9, in the damping device 8 are shown as a preferred construction, it should be apparent that many other forms of frictional, energy-absorbing means between the weights 8 and spring 3 would be suitable to effect the desired result. Also, the weights need not be disposed horizontally, as shown, but may be suspended vertically, so long as their oscillation occurs in a vertical plane so that the damping couple has a component in opposition to the vertical vibration of the cable.

Quite obviously, various modifications may be made in the invention without departing from the spirit and scope thereof, and it is desired that only such limitations be placed thereon as are imposed by the prior art and set forth in the appended claims.

I claim as my invention:

1. In combination with a transmission line cable and a support therefor, of a cable suspension device for securing the cable to the support including an elongated member secured to the cable at spaced points on opposite sides of the support, resilient extremities on said elongated member, and a substantial mass secured to the free ends of said extremities for oscillation therewith in response to oscillations of said cable.

2. A supporting device for a transmission line cable comprising a resilient tie member for disposition longitudinally of the cable and in contact therewith, means adjacent the ends of said tie member for securing it to the cable, means engaging the central portion of said tie member and free of the cable for securing the clamp to a support, and damping weights secured to the extremities of said tie member.

3. A supporting device for a transmission line cable comprising a flat resilient strip flexible in a vertical plane for disposition beneath the cable longitudinally thereof and having end portions curved laterally to partially embrace said cable, clamps for securing said end portions to the cable, a member engaging the central portion of said strip and loosely surrounding the cable, a spacing device between said cable and member to prevent relatively horizontal movement therebetween, and means pivotally secured to said member for securing the assembly to a support including means for maintaining said member and strip in operative position.

4. A supporting device for a transmission line cable comprising a flat strip having a substantial resiliency in a vertical plane for disposition beneath the cable longitudinally thereof having end portions curved laterally to conform to said cable and having a deformed central portion, clamps for securing said end portions to the cable, a shoe engaging the central portion of said strip and loosely surrounding the cable, a spacing device cooperating with said cable and shoe to prevent relative horizontal movement therebetween, means for retaining said spacing device in operative position, and means pivotally secured to said shoe for securing the assembly to a support including a bolt extending transversely of the shoe cooperating with the deformed central portion of said strip to maintain the shoe and strip in operative relation.

5. A vibration damper comprising a strip of resilient material having one end adapted to be secured to a vibrating body, a weight of substantial mass extending partly along said strip and secured to the free extremity thereof, and a curved surface on said weight for cooperating with a flat side of said strip whereby when the damper is in oscillation the point of contact between the weight and strip is varied.

6. A vibration damper comprising a strip of resilient material having one end adapted to be secured to a vibrating body, a weight of substantial mass extending partly along said strip and secured to the free extremity thereof, a surface on said weight opposite the flat side of said strip having a contour which gradually curves away from said strip from its point of contact therewith; the center of gravity of said weight being spaced from its point of contact with the strip in a direction longitudinally of the strip.

7. A vibration damper comprising a strip of resilient material having one end adapted to be secured to a vibrating body, a weight of substantial mass extending partly along said strip and secured to the free extremity thereof, and a curved surface on said weight for cooperating with a flat side of said strip whereby when the damper is in oscillation the point of contact between the weight and strip is varied and means between said weight and strip for frictionally absorbing relative vibrations therebetween.

8. In combination with a body subject to vibration, a vibration damper comprising means set into vibration in response to the vibration of said body, means for varying the period of vibration of said first means to change the period of vibration of said body and energy dissipating means between said first and second mentioned means.

EDWIN E. ARNOLD.